United States Patent [19]

Nakamura et al.

[11] 4,279,630
[45] Jul. 21, 1981

[54] AIR CLEANING MEANS FOR INTERNAL COMBUSTION ENGINE

[75] Inventors: Yasuhiko Nakamura, Toyohashi; Yoshio Yamakawa, Toyota, both of Japan

[73] Assignee: Nippondenso Co., Ltd., Kariya, Japan

[21] Appl. No.: 17,958

[22] Filed: Mar. 6, 1979

[30] Foreign Application Priority Data

Mar. 7, 1978 [JP] Japan ............................. 53/28993[U]

[51] Int. Cl.³ ..................... B01D 50/00; F02M 33/02
[52] U.S. Cl. .................................... 55/316; 123/518; 55/517; 55/501
[58] Field of Search ................. 123/136, 518; 55/316, 55/387, 517, 486, 499, 501, 510

[56] References Cited

U.S. PATENT DOCUMENTS

| 2,574,053 | 11/1951 | McGowan | 55/510 |
| 3,541,765 | 11/1970 | Adler et al. | 123/136 |
| 3,572,013 | 3/1971 | Hansen | 123/136 |
| 3,572,014 | 3/1971 | Hansen | 123/136 |
| 3,747,303 | 7/1973 | Jordan | 55/387 |
| 4,139,354 | 2/1979 | Giles | 55/510 |

Primary Examiner—Ira S. Lazarus
Assistant Examiner—Magdalen Moy
Attorney, Agent, or Firm—Cushman, Darby & Cushman

[57] ABSTRACT

Air cleaning means suitable for use with an internal combustion engine including a fuel vapor adsorbing filter element and a sucked air cleaning filter element arranged independently of and separately from each other. The fuel vapor adsorbing filter element includes a filter material layer containing fibers of active carbon for adsorbing fuel vapors thereon, and a metallic reinforcing member, while a sucked air cleaning filter element includes a filter material layer of the usual type for cleaning the air drawn by suction into a combustion chamber of the internal combustion engine. The fuel vapor adsorbing filter element may further include a plurality of reinforcing layers of nonwoven fabric each located on one of opposite sides of the filter material layer. The filter material layer and the reinforcing layers of nonwoven fabric may be formed with a plurality of apertures extending therethrough, and an additional layer of nonwoven fabric may be mounted between the metallic reinforcing member and one of the plurality of reinforcing members of nonwoven fabric which is located inside the filter material layer.

4 Claims, 7 Drawing Figures

AIR CLEANING MEANS FOR INTERNAL COMBUSTION ENGINE

BACKGROUND OF THE INVENTION

This invention relates to air cleaning means for use with an internal combustion engine which adsorbs fuel vapors produced in the carburetor and intake manifold to avoid the release of hydrocarbons to atmosphere.

Heretofore, in order to avoid the release of hydrocarbons to atmosphere from internal combustion engines by adsorbing on an air cleaner element fuel vapors produced in the carburetor and intake manifold, proposals have been made to use various air cleaner element structures. The air cleaner element structures known in the art include: (1) an air cleaner filter element mounted in an air cleaner case and divided into two or more constituent parts, one part containing active carbon in particulate form, (2) a filter element including a folded filter material layer packed with active carbon in particulate form between the folds, and (3) an arrangement in which active carbon in particulate form is mounted in the interior of an inlet pipe of the air cleaner case or in the vicinity of the carburetor mounting portion of the air cleaner case so as to adsorb fuel vapors produced in the carburetor and intake manifold and flowing to the air cleaner element.

Some disadvantages are associated with these air cleaner element structures of the prior art. If active carbon in particulate form is arranged in the air cleaner case as proposed in the structures of (1) and (3), the vibration of the engine would be directly transmitted to the particulate active carbon in a construction in which the air cleaner case is directly mounted on the carburetor, with the result that wear would be caused on the particulate active carbon by the vibration and the pulverized active carbon would be drawn by suction into the carburetor. This would cause the carburetor to malfunction.

Various problems arise in the case of the arrangement of (2) in which particulate active carbon is packed between the folds of the folded air cleaner filter material layer of a filter element. These problems would include complication of the process for securing the particles of active carbon in place, the need to perform a time-consuming operation of packing the particulate active carbon in the folds of the filter material layer, and obturation of the filter material layer of the air cleaner element by the pulverized active carbon as the result of the wear caused by the vibration of the engine on the active carbon.

SUMMARY OF THE INVENTION

This invention has as its object the provision of air cleaning means suitable for use with an internal combustion engine which obviates the aforementioned problems encountered in providing an air cleaner element of the prior art which is intended to adsorb fuel vapors thereon.

The aforesaid object can be accomplished by providing, in an air cleaning means, a fuel vapor adsorbing filter element including a filter material layer containing fibers of active carbon, in addition to a usual filter element for cleaning air drawn by suction, the two filter elements being independent of and separate from each other in the air cleaning means. The arrangement in which the two filter elements are separate entities enables the two filter elements to be replaced and reused independently of each other, thereby reducing filter element replacement cost and facilitating the reuse of filter elements. According to the invention, a suitable percentage of voids can be provided to the fibers of active carbon of the fuel vapor adsorbing filter element for facilitating the flow of air therethrough. The fact that the filter material layer of the fuel vapor adsorbing filter element contains fibers of active carbon permits wear and disintegration of active carbon due to vibration to be avoided.

Other and additional objects, features and advantages of the invention will become apparent from the description set forth hereinafter when considered in conjunction with the accompanying drawings.

DESCRIPTION OF THE EMBODIMENTS

Figure 1:
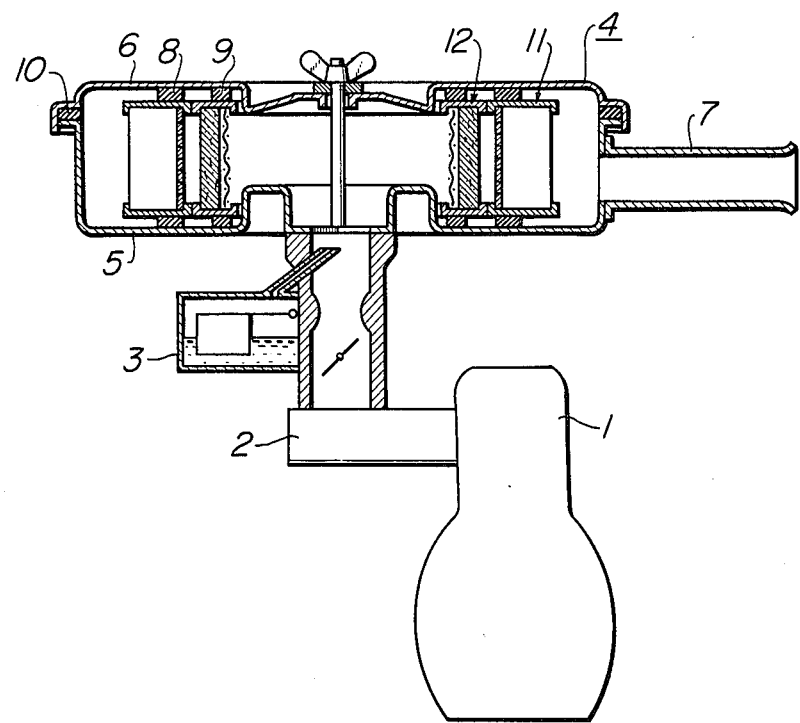
FIG. 1 is a sectional view of the air cleaning means comprising one embodiment of the invention, showing the air cleaning means mounted on an automotive vehicle along with an internal combustion engine.

Embodiments of the invention will now be described by referring to the accompanying drawings. In FIGS. 1 to 4, there is shown an internal combustion engine 1 connected to a carburetor 3 through an intake manifold 2. Air cleaning means generally designated by the numeral 4 comprises a cleaner case 5, a cap 6, an inlet pipe 7, element gaskets 8 and 9, a case gasket 10, a sucked air cleaning filter element 11 and a fuel vapor adsorbing filter element 12. The sucked air cleaning filter element 11 is of the usual type and includes end plates 13 formed of vinyl chloride, urethane resin or sheet iron, a perforated metallic reinforcing member 14 and a filter material layer 15 formed of filter paper, nonwoven fabric, etc., and folded in corrugated form. The fuel vapor adsorbing filter element 12 includes end plates 16 formed of sheet iron, resin in plate form, etc., and having a coat of adhesive thereon, a metallic reinforcing member 17 formed of metallic net, perforated sheet iron, etc., and a felt-like filter material layer 18 of the annular shape formed of one of fibers of active carbon, a mixture of fibers of active carbon and cellulose fibers and a mixture of fibers of active carbon, cellulose fibers and synthetic fibers.

The filter material layer 18 and reinforcing member 17 are rendered unitary by the end plates 16. The fuel vapor adsorbing filter element 12 is arranged inwardly of, and concentrically with, the sucked air cleaning filter element 11. The positions of the two filter elements 11 and 12 may be reversed. The fibers of active carbon of the filter material layer 18 of the fuel vapor adsorbing filter element 12 may be produced, for example, by roasting rayon or other synthetic fibers or pulp or other natural fibers to carbonize such fibers, partially oxidizing the carbonaceous fibers to convert them into fiber-like active carbon, and blending the fiber-like active carbon with pulp after fiber-like active carbon is loosened, so as to obtain the filter material for the layer 18 containing fibers of active carbon.

In the aforesaid arrangement, the fuel air introduced through the inlet pipe 7 of the air cleaning means 4 is purified by the sucked air cleaning filter element 11 as the air passes through the filter material layer 15, to be drawn by suction into a combustion chamber, not shown, of the internal combustion engine 1. Meanwhile, the fuel vapors produced in the intake manifold 2 and carburetor 3 are adsorbed on the filter material layer 18 of the fuel vapor adsorbing filter element 12, and the fuel vapors adsorbed on the layer 18 are drawn by suction into the combustion chamber together with clean air when the internal combustion engine 1 is operated. Thus release of the fuel vapors to atmosphere can be avoided.

Figure 5:
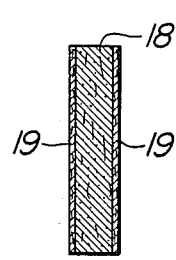
FIGS. 5 to 7 are sectional views of other embodiments of the invention, showing the essential portions thereof.

FIG. 5 shows another embodiment of the invention in which, in addition to the metallic reinforcing member 17, a plurality of reinforcing layers 19 of nonwoven fabric are each secured to one of opposite sides of the felt-like filter material layer 18 of the fuel vapor adsorbing filter element 12 by a needle punch method. In this embodiment, the felt-like filter material layer 18 can be protected from damage by the reinforcing layers 19.

Figure 6:
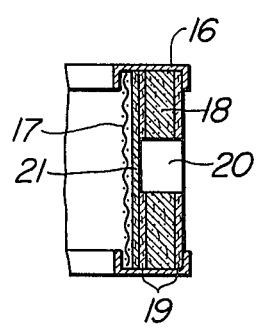

In FIG. 6, there is shown still another embodiment of the invention in which the felt-like filter material layer 18 and reinforcing layers 19 are formed with apertures 20 of a suitable number extending therethrough, and an additional reinforcing layer 21 of nonwoven fabric is wound around the reinforcing layer 19 located on the side of the filter material layer 18 through which the air that has passed through the filter material layer 18 is introduced into the carburetor 3, so as to prevent specks of lint from being drawn by suction into the carburetor 3 when the fibers of active carbon may accidentally be damaged in portions thereof corresponding to the apertures 20. In this embodiment, the provision of the apertures 20 in the filter material layer 18 enables the resistance offered by the fuel vapor adsorbing filter element 12 to the passage of air to be reduced while increasing the surface area of the filter material layer 18. The reinforcing layers 19 of nonwoven fabric may be formed of rayon, vinylon (the term representing polyvinyl alcohol base synthetic fibers produced in Japan), polyester, etc. The reinforcing layers 19 and 21 of nonwoven fabric have a thickness in the range between 0.5 and 1 mm. The felt-like filter material layer 18 may, for example, have an inner diameter of about 176 mm, an outer diameter of about 200 mm and a height of about 57 mm. The density of fibers of the layer 18 may be in the range between 0.02 and 0.15 gr/cm$^3$, preferably in the range between 0.05 and 0.07 gr/cm$^3$. The percentage of voids of the layer 18 may be in the range between 10 and 40%, preferably about 30%, and the apertures 20 may have a diameter in the range between 10 and 20 mm and may be 150 to 200 in number.

Figure 7:
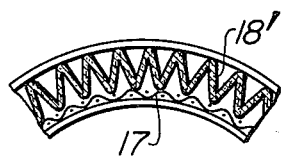

In FIG. 7, the filter material layer 18 is like paper and folded in corrugated form. In this embodiment, the filter material layer 18' has a thickness of about 0.5 mm.

Figure 2:
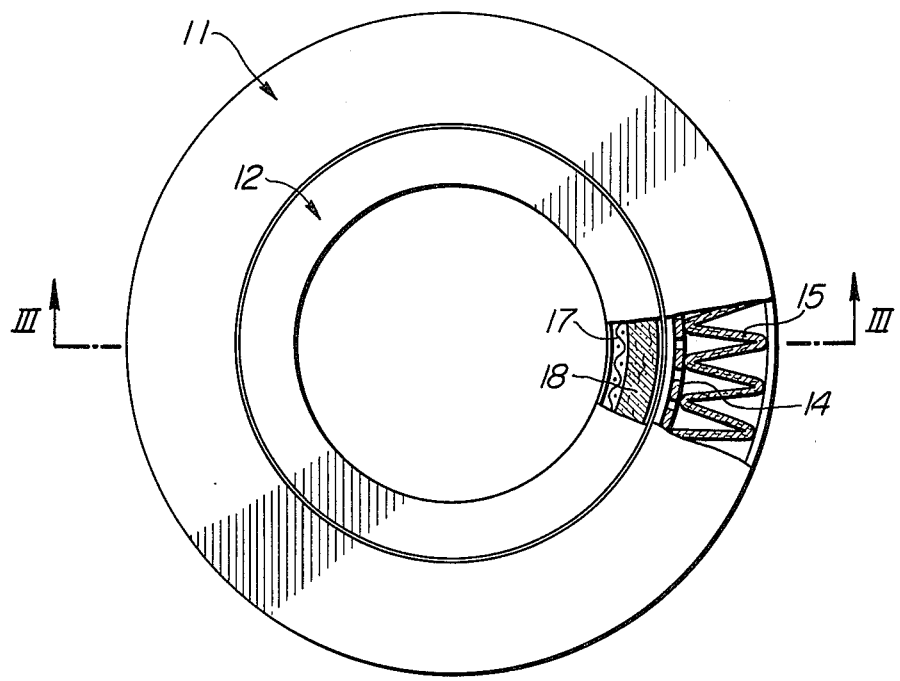
FIG. 2 is a plan view, with certain parts being broken away, of the air cleaning means shown in FIG. 1.
Figure 3:
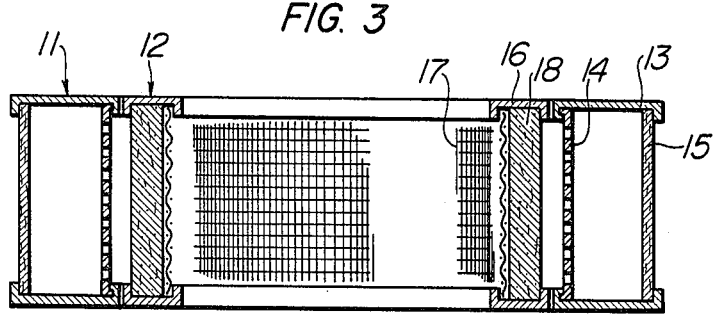
FIG. 3 is a sectional view taken along the line III—III in FIG. 2.
Figure 4:
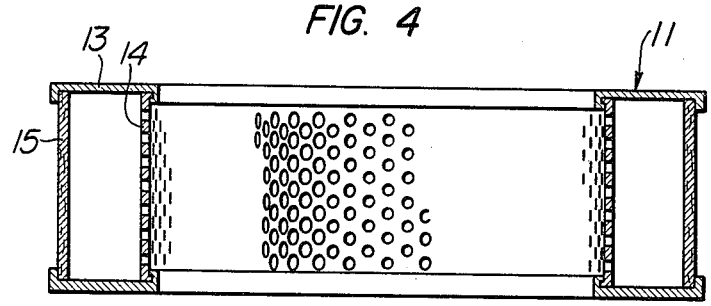
FIG. 4 is a sectional view of the sucked air cleaning filter element of the air cleaning means shown in FIG. 3.

Various embodiments of the invention have been shown and described hereinabove. However, it is to be understood that the invention is not limited to the specific forms of these embodiments and that various changes and modifications may be made therein within the scope of the invention. Such modifications may include the following:

(1) The filter material layer 15 of the sucked air cleaning filter element 11 may not be folded to be corrugated in form in section as shown in FIG. 2. Instead, the filter material layer 15 may have its thickness increased and may be in plate form.

(2) When the filter material layer 15 of the sucked air cleaning filter element 11 is in the form of a plate as described in (1), the end plates 13 and reinforcing member 14 may be dispensed with. The end plates 16 and reinforcing member 17 of the fuel vapor adsorbing filter element 12 may be dispensed with also.

(3) The air cleaning means according to the invention can have application in internal combustion engines of automotive vehicles provided with electric fuel injection means, internal combustion engines for motor cycles and internal combustion engines for agricultural implements, in addition to ordinary internal combustion engines for automotive vehicles.

As aforesaid, the air cleaning means according to the invention comprises the fuel vapor adsorbing filter element 12 comprising the filter material layer 18 or 18' including fibers of active carbon for adsorbing fuel vapors thereon, and the sucked air cleaning filter element 11 comprising the filter material layer 15 for cleaning the air introduced into the internal combustion engine 1, the two filter elements 11 and 12 being independent and separate from each other in construction. By this arrangement, the invention is capable of solving the problem of wear being caused on particulate active carbon and pulverized active carbon being drawn by suction into the carburetor 3 to cause malfunction of the carburetor, which problem has been experienced in the prior art in which active carbon in particulate form is used as means for adsorbing fuel vapors.

The arrangement that the fuel vapor adsorbing filter element 12 and the sucked air cleaning filter element 11 are provided as separate entities permits replacements of the elements 11 and 12 to be effected readily when the elements 11 and 12 are obturated or the fuel vapor adsorbing ability of the element 12 is lowered, thereby reducing replacement cost. The two filter elements 11 and 12 can be fabricated in separate production processes, and control of quality can be readily effected at the time of production. An added advantage is that the filter elements 11 and 12 can be designed independently of each other so that the element 11 may have a desired air cleaning ability and the element 12 may have a desired fuel vapor adsorbing ability, depending on the type of the internal combustion engine 1 with which the air cleaning means is used.

What is claimed is:

1. Air cleaning means for use with an internal combustion engine comprising:
   a sucked air cleaning filter element; and
   a fuel vapor adsorbing filter element mounted independently of and separately from said sucked air cleaning filter element, said fuel vapor adsorbing filter element including a filter material layer containing fibers of active carbon for adsorbing fuel vapors thereon, a metallic reinforcing member, a plurality of reinforcing layers of nonwoven fabric each located on one of opposite sides of said filter material layer, said filter material layer and said plurality of reinforcing layers of nonwoven fabric being formed with a plurality of apertures extending therethrough so that said filter material layer will have a percentage of voids in the range between 10 and 40%, and an additional layer of nonwoven fabric mounted between said metallic reinforcing member and one of said plurality of reinforcing layers located inwardly of said filter material layer.

2. An air cleaning means for use with an internal combustion engine comprising:

a cleaner case;

a cap mounted on said cleaner case;

a fuel vapor adsorbing filter element including a filter material layer containing fibers of active carbon for adsorbing fuel vapors, a plurality of end plates and a metallic reinforcing member, said end plates rendering said filter material layer and said metallic reinforcing member unitary in structure;

an air cleaning filter element including a filter material layer for cleaning air drawn by suction into a combustion chamber of the internal combustion engine; and a plurality of gaskets fitted between said cleaner case and said cap on the one hand and said fuel vapor adsorbing filter element and said sucked air cleaning filter element on the other so that said fuel vapor adsorbing filter element and said air cleaning filter element are fitted in said cleaner base beneath said cap and securely held in place by said gaskets independently of and separately from each other, wherein said fuel vapor adsorbing filter element further includes a plurality of reinforcing layers of non-woven fabric each located on one of the opposite sides of said filter material layer.

3. An air cleaning means for use with an internal combustion engine comprising:

a cleaner case;

a cap mounted on said cleaner case;

a fuel vapor adsorbing filter element including a filter material layer containing fibers of active carbon for adsorbing fuel vapors theren, a plurality of end plates, a metallic reinforcing member, said end plates rendering said filter material layer and said metallic reinforcing member unitary in structure, a plurality of reinforcing layers of non-woven fabric located on one side of said filter material layer, and a plurality of apertures formed in said filter material layer and at least one of said reinforcing layers in a manner to extend therethrough;

an air cleaning filter element including a filter material layer for cleaning the air drawn by suction into a combustion chamber of the internal combustion engine; and a plurality of gaskets fitted between said cleaner case and said cap on the one hand and said fuel vapor adsorbing filter element and said sucked air cleaning filter element on the other so that said fuel vapor adsorbing filter element and said sucked air cleaning filter element are fitted in said cleaner case beneath said cap and securely held in place by said gaskets independently of and separately from each other, and said plurality of apertures enable the resistance offered by the fuel vapor adsorbing filter element to the passage of air to be reduced while increasing the surface area of the filter material layer.

4. An air cleaning means as in claim 2 wherein said cap is removably mounted on said cleaner case.

* * * * *